US008725341B2

(12) United States Patent
Ogasawara

(10) Patent No.: US 8,725,341 B2
(45) Date of Patent: May 13, 2014

(54) NAVIGATION APPARATUS AND METHOD OF NAVIGATION

(75) Inventor: Akihiro Ogasawara, Toyokawa (JP)

(73) Assignee: DENSO CORPORATION, Kariya (JP)

( * ) Notice: Subject to any disclaimer, the term of this patent is extended or adjusted under 35 U.S.C. 154(b) by 721 days.

(21) Appl. No.: 12/923,151

(22) Filed: Sep. 7, 2010

(65) Prior Publication Data

US 2011/0066367 A1  Mar. 17, 2011

(30) Foreign Application Priority Data

Sep. 17, 2009 (JP) .................................. 2009-215734
Jul. 28, 2010 (JP) .................................. 2010-169468

(51) Int. Cl.
*G01C 22/00* (2006.01)

(52) U.S. Cl.
USPC ............... 701/23; 701/26; 701/411; 701/413; 701/416; 701/418; 701/420; 701/428

(58) Field of Classification Search
USPC ............ 701/23, 26, 418, 411, 413, 416, 420, 701/428, 517
See application file for complete search history.

(56) References Cited

U.S. PATENT DOCUMENTS

| 7,171,369 | B1 * | 1/2007 | Bertram et al. .................... 705/5 |
| 7,426,689 | B2 * | 9/2008 | Simonds et al. ............... 715/234 |
| 7,802,724 | B1 * | 9/2010 | Nohr ............................. 235/384 |
| 8,082,095 | B2 * | 12/2011 | Sumcad et al. ............... 701/516 |
| 2001/0049580 | A1 * | 12/2001 | Kusano et al. ................ 701/200 |
| 2004/0078138 | A1 * | 4/2004 | Nishimori ....................... 701/201 |
| 2004/0204968 | A1 * | 10/2004 | Bertram et al. ..................... 705/5 |
| 2006/0129553 | A1 * | 6/2006 | Simonds et al. .................... 707/6 |
| 2006/0155591 | A1 * | 7/2006 | Altaf et al. ......................... 705/5 |
| 2008/0177584 | A1 * | 7/2008 | Altaf et al. ......................... 705/5 |
| 2009/0008439 | A1 * | 1/2009 | Kubler et al. ................. 235/375 |
| 2009/0171701 | A1 * | 7/2009 | Bertram et al. ..................... 705/6 |
| 2009/0171782 | A1 * | 7/2009 | Stolbun et al. .................. 705/14 |
| 2010/0070168 | A1 * | 3/2010 | Sumcad et al. ............... 701/206 |
| 2010/0106514 | A1 * | 4/2010 | Cox ............................... 705/1.1 |
| 2011/0040595 | A1 * | 2/2011 | Chou et al. ......................... 705/8 |
| 2012/0274484 | A1 * | 11/2012 | Zimmer et al. ............... 340/945 |

FOREIGN PATENT DOCUMENTS

| JP | A-2000-193477 | 7/2000 |
| JP | A-2001-349740 | 12/2001 |

(Continued)

OTHER PUBLICATIONS

Office Action mailed Aug. 2, 2011 in corresponding JP application No. 2010-169468 (and English translation).

*Primary Examiner* — Khoi Tran
*Assistant Examiner* — Jorge Peche
(74) *Attorney, Agent, or Firm* — Posz Law Group, PLC

(57) ABSTRACT

A navigation apparatus guides a user to an appropriate terminal in an airport, for example, even when a schedule of an intended flight is changed. The above advantage is achieved by acquiring flight information of the intended flight from a flight information list that is delivered from an information distribution center and by determining, as a guidance destination, a terminal of the intended flight or a suitable airport facility after change of the flight schedule. The suitable guidance destination is determined not only by the changed flight schedule but also by a user purpose to go to the airport and an estimated arrival time of the user to the airport.

25 Claims, 9 Drawing Sheets

(56) References Cited

FOREIGN PATENT DOCUMENTS

| JP | A-2003-90733 | 3/2003 |
| JP | A-2003-109196 | 4/2003 |
| JP | A-2006-99483 | 4/2006 |
| JP | A-2007-248472 | 9/2007 |
| JP | A-2008-64466 | 3/2008 |
| JP | A-2008-238894 | 10/2008 |
| JP | A-2009-14536 | 1/2009 |

* cited by examiner

| DEPARTURE (12:30) | | | | |
|---|---|---|---|---|
| FLIGHT NO. | JL400 | NH6000 | TK50 | KE700 |
| CARRIER | JAL | ANA | TK | KAL |
| TERMINAL | 2 | 1 | 2 | 1 |
| FROM | NARITA | NARITA | NARITA | NARITA |
| TO | LONDON | MUNICH | ISTANBUL | SEOUL |
| DEPARTURE TIME | 12:20 | 12:40 | 12:19 | 10:10 |
| CONDITION | IN FLIGHT | WAIT | WAIT | CANCEL |
| STATUS | ON SCHE | ON SCHE | DELAY 30 | CANCEL |

| ARRIVAL (12:30) | | | | |
|---|---|---|---|---|
| FLIGHT NO. | JL100 | NH6900 | JL5230 | KE200 |
| CARRIER | JAL | ANA | JAL | KAL |
| TERMINAL | 2 | 1 | 2 | 1 |
| FROM | HONOLULU | SEOUL | SHANGHAI | SEOUL |
| TO | NARITA | NARITA | NARITA | NARITA |
| ARRIVAL TIME | 12:25 | 12:35 | 12:20 | 11:00 |
| CONDITION | ARRIVED | IN FLIGHT | IN FLIGHT | CANCEL |
| STATUS | ON SCHE | ON SCHE | DELAY 45 | CANCEL |

FIG. 9

| | DIST TO TERMINAL | PICKUP | RIDE FEE | 1 DAY | 2 DAY | 3 DAY | 4 DAY | 5 DAY | 6 DAY | 7 DAY | 8 DAY |
|---|---|---|---|---|---|---|---|---|---|---|---|
| PARK A | 0 | NO | 0 | 1500 | 3000 | 4500 | 6000 | 7500 | 9000 | 10500 | 12000 |
| PARK B | 1.5 | AVAILABLE | 0 | 500 | 1000 | 1500 | 2000 | 2500 | 3000 | 3500 | 4000 |
| PARK C | 1 | AVAILABLE | 0 | 800 | 1600 | 2400 | 3200 | 4000 | 4800 | 5600 | 6400 |
| PARK D | 2 | NO | 500 | 2900 | 3500 | 4500 | 5400 | 6300 | 7200 | 7500 | 7500 |
| PARK E | 0.5 | NO | 0 | 1800 | 2600 | 3400 | 4200 | 5000 | 5800 | 6600 | 7400 |

UNIT OF MONEY : JP YEN

NAVIGATION APPARATUS AND METHOD OF NAVIGATION

CROSS REFERENCE TO RELATED APPLICATION

The present application is based on and claims the benefit of priority of Japanese Patent Applications No. 2009-215734, filed on Sep. 17, 2009, and No. 2010-169468, filed on Jul. 28, 2010, the disclosure of which are incorporated herein by reference.

FIELD OF THE INVENTION

The present invention generally relates to a navigation apparatus that navigates a user and a vehicle to a specific terminal in an airport.

BACKGROUND INFORMATION

In recent years, navigation apparatuses for providing guidance for a user to enable the user to reach a destination based on a searched route that leads to a destination are widely known. Further, some of those navigation apparatuses guide the user further to a specific building in a site such as an airport. For example, Japanese patent document 1 listed in the following discloses a navigation apparatus that notifies the user of a terminal building accommodating a specific carrier by allowing the user to input a carrier selection if a boarding place of a vehicle (i.e., an aircraft) is specified as a destination.

Japanese patent document 1:JP-A-2001-331606 (US2001/0049580)

However, the flight of the aircraft may be delayed, canceled, or the arriving terminal may be changed, due to the weather, mechanical problem of the aircraft or the like. In case of those cancellation or terminal change, the navigation apparatus of the Japanese patent document 1 cannot accommodate the troubled situation of flight cancellation, change of the arriving terminal or the like, because the conventional navigation apparatus does not take into account updated schedule information of the flight at the moment (i.e., during the travel to the airport). That is, it is impossible for the navigation apparatus to provide suitable guidance for the user in case of flight cancellation, terminal change or the like.

SUMMARY OF THE INVENTION

In view of the above and other problems, the present invention provides a navigation apparatus that provides guidance for a user to a suitable destination in a large site such as an airport, where multiple facility buildings (i.e., departure/arrival terminals and parkings) are included in one place having a relatively large area, even when schedule information of a user-desired transportation vehicle (i.e., flight schedule) is changed.

The navigation apparatus for providing a user with guidance to a destination includes: a service number determination unit for determining a service number of a vehicle service based on a user input; a destination determination unit for determining, as the destination of the guidance, a terminal-related place in an entire vehicle boarding place of the vehicle service based on the service number determined by the service number determination unit; a service information acquisition unit for acquiring, from an information center, service information of the vehicle service having the service number determined by the service number determination unit, the service information including a schedule change condition of the determined service number of the vehicle service; and a guidance provision unit for providing the user with diversion advisory guidance regarding diversion of the terminal-related place from an original destination that is originally determined by the destination determination unit based on the acquired service information of the vehicle service.

According to the above-described features, even when the departure/arrival terminal of the flight of the user's choice is changed from a scheduled one, the navigation apparatus of the present invention can provide a guidance that enables the user to go to the terminal-related place, that is, a front entrance of a terminal building to which the flight is directed after the change of the schedule, or a parking space that is closest to that terminal building. Therefore, the user of the navigation apparatus is prevented from wasting time by going to a wrong terminal in the airport, or from having difficulty in finding a way to a terminal in the airport in case that an intended flight has a schedule change to be directed to a different terminal in the same airport.

BRIEF DESCRIPTION OF THE DRAWINGS

Objects, features, and advantages of the present disclosure will become more apparent from the following detailed description made with reference to the accompanying drawings, in which:

FIG. 2 is a diagram which shows the part of the flight information list which is distributed from the information distribution center in the embodiment of the present invention;

FIG. 9 is an illustration of a fee table used in a process of the guidance subroutine of boarding in the embodiment of the present invention.

DETAILED DESCRIPTION

Figure 1:
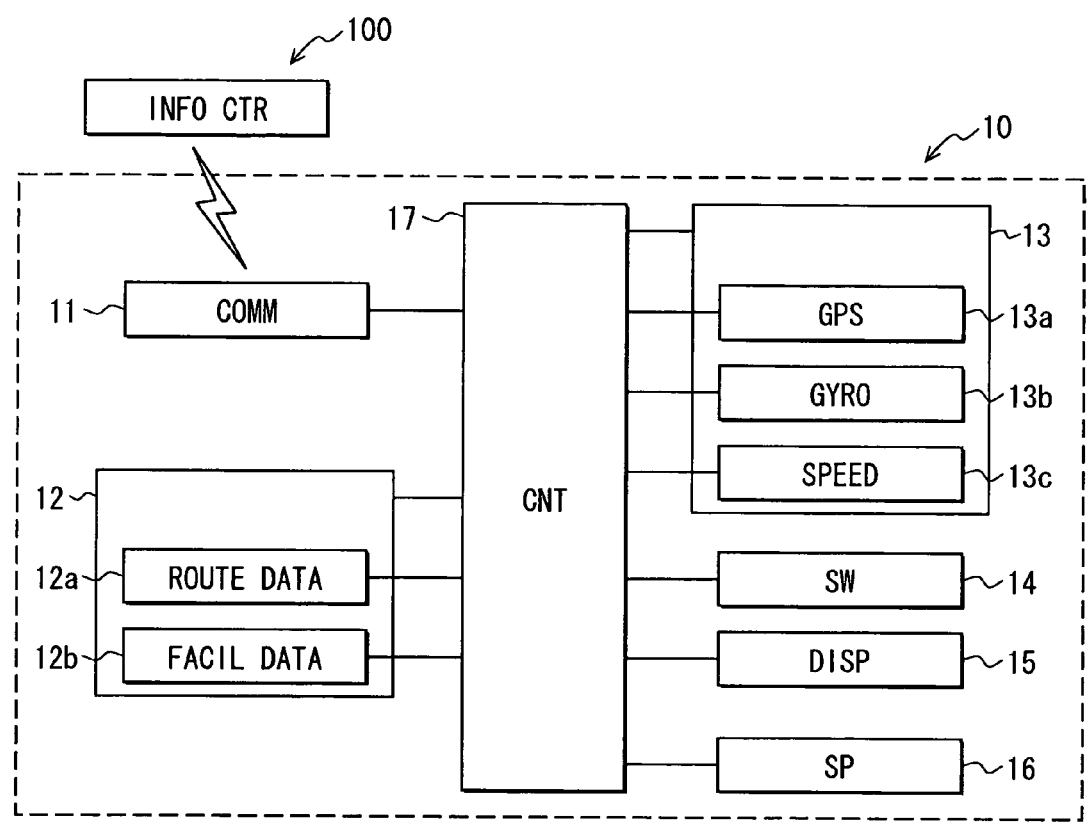
FIG. 1 is a block diagram which shows a composition of a navigation apparatus in the embodiment of the present invention.

An embodiment of the present invention is described with reference to the drawing. Practically, in an example of the present embodiment, the present invention is applied to a vehicle navigation apparatus which is disposed in a vehicle, and the vehicle navigation apparatus guides the user to an airport when the airport is set as a destination. Further, the present invention is not limited to the following example in the embodiment, but it may also used to guide the user to a seaport or a large train station that have multiple terminals. In other words, various apparatuses may embody the present invention as long as they pertain to the scope of the invention.

FIG. 1 is a block diagram which shows an outline composition of the vehicle navigation apparatus 10 of the present embodiment. The vehicle navigation apparatus 10 is equipped with a communication unit 11, a map data storage 12, a vehicle position detection unit 13, an operation switch 14, a display unit 15, an audio-output unit 16 and a control unit 17. Practically, the vehicle navigation apparatus 10 sends and receives information to and from an information distribution center 100 through the communication unit 11.

The communication unit 11 is a communication equipment which includes a transmitter and a receiver, and sends and receives data to and from the information distribution center 100. The communication unit 11 receives a flight information list 101 which is distributed from the information distribution center 100 that is external to the vehicle and to the navigation apparatus 10. FIG. 2 shows a part of the flight information list 101 distributed from the information distribution center 100. The list 101 shows flight information at a time of 12:30. The list 101 is updated every minute or the like at the center 100, and the updated list 101 is distributed to the vehicle every 30 minutes or the like. The list 101 includes information on flight numbers, carrier names, terminal numbers, departure places ("FROM" in FIG. 2), destinations ("TO" in FIG. 2), departure times, arrival times, flight conditions, delays/cancellation, flight statuses (e.g., terminal change, and the like) for departing/arriving flights. When the flight information, such as the schedule of the flight, is changed, the contents of the change of the flight information are displayed in the flight status. The flight information list 101 distributed from the information distribution center 100 is broadcasted for the neighborhood area of every airport. For example, the flight information list 101 at an airport which exists in Aichi prefecture of Japan is distributed for Toukai district that includes Aichi prefecture, Gifu prefecture, Mie prefecture, and Shizuoka prefecture, for the traveling vehicles.

The map data storage 12 stores route data 12a that is used for route search, and facility data 12b containing units of map information that is used for drawing a map on the display unit 15. Further, though not illustrated in the drawing, images and sounds for providing guidance are also stored in the storage 12. The storage 12 is a storage medium of ROM (Read Only Memory), a readable/writable hard disk and/or a memory.

The route data 12a is stored as network information of nodes (i.e., points represented by latitude and longitude) and links that connect those nodes, which represents road map information and road information in large-size facilities.

Each of the links for representing the road has, for example, attribute information of a road type such as an expressway, a major road, a street, an inside-facility road and the like, as well as traffic regulations of no right/left turn, one way, plus road shapes, link lengths, road width, the number of lanes, slopes and the like. Based on those kinds of information, each of the links has an assigned cost. The route data 12a is used to route calculation in the control unit 17 based on the network information and the costs by using well-known Dijkstra method. That is, an optimum route is calculated as a minimum cost route to the destination.

The facility data 12b stores polygon data of roads, buildings, private lands and the like, together with background data such as rivers, seas, and positions of the facilities on the map. In addition, for the large-size facility, position information of multiple terminals, buildings, parking areas and the like is stored in association with the respective large-size facilities. For example, an airport, a terminal station of trains, a shopping mall, a theme park and the like that have multiple buildings and multiple zones are listed as examples. More practically, if a large-size airport is considered, position information of each of the multiple terminals as well as entrances for departure gates and arrival gates, each of the multiple parking areas, plus hotels and shopping malls included in the site of the airport is associated with the airport.

The vehicle position detection unit 13 includes a GPS receiver 13a, a gyro sensor 13b, and a speed sensor 13c, for detecting a present position of the vehicle and a current time based on GPS signals received by an antenna, for detecting rotational motion of the vehicle and for detecting vehicle speed. The vehicle position detection unit 13 calculates the present vehicle position as a set of the position coordinate and the travel direction based on detection signals from those sensors 13a to 13c. Further, those sensors 13a to 13c may be used in a mutually-compensating manner based on the errors of respectively different natures. Furthermore, the position detection unit 13 may be composed of a part of those sensors 13a to 13c. In addition, a geomagnetic sensor for detecting geomagnetism, a steering rotation sensor may also be used in the position detection unit 13.

Figure 3A:
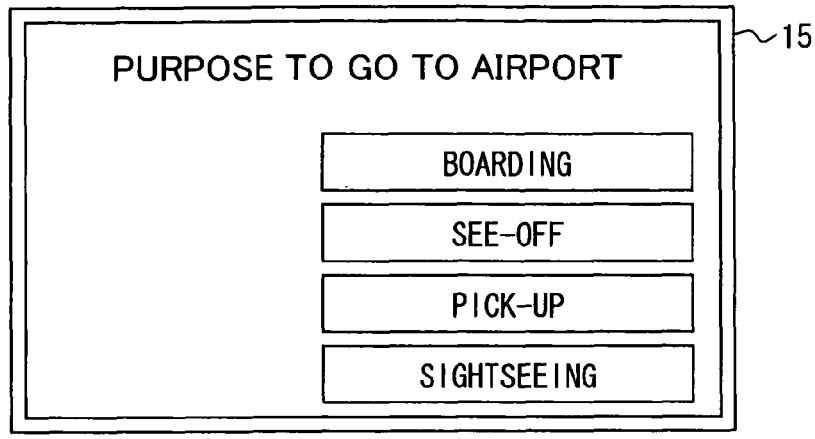
FIGS. 3A to 3C are diagrams which respectively show a purpose set screen, a flight number input screen, and a guide stop input screen in an embodiment of the present invention.
Figure 3B:
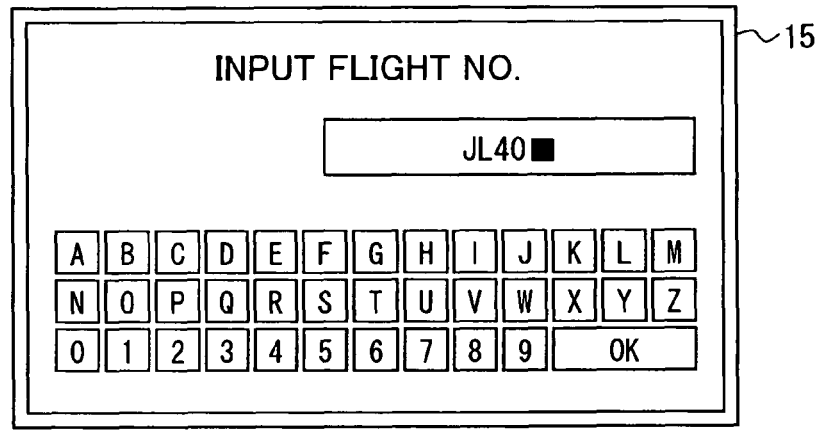
Figure 3C:
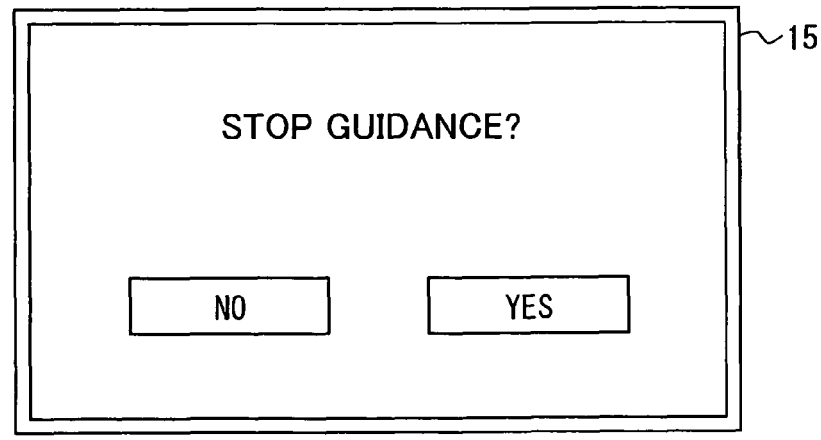

The operation switch 14 is formed integrally with the display unit 15, and includes a touch panel which is installed on the display-screen, button switches which are arranged around the display unit 15, and the like. The touch panel and the display unit 15 are layered to have one body, the touch panel may use various touch detection methods such as the pressure-sensitive method, the inductive coupling method, the capacitance method or a combination of those methods. The operation switch 14 is used to accept a user input to the navigation apparatus 10. For example, as shown in FIG. 3A, when a purpose selection screen for allowing the user to input a purpose to go to the airport is displayed, the user may press a "BOARDING" button by the finger or the like to select the purpose. Or, as shown in FIG. 3B, when a screen for flight number input is displayed, the user may press the number keys and alphabet keys for directly inputting the flight number. Or, as shown in FIG. 3C, when a screen for guidance continuation is displayed, the user may press one of "YES" or "NO" to indicate his/her choice.

The display unit 15 is composed of a liquid crystal display which is capable of displaying in colors. The display screen of the display unit 15 displays a map that is made up from polygon data and background data memorized as the facility data 12b together with a current vehicle position mark and a route to the destination superposed thereon. Further, map marks of facilities as well as name of the places and facilities and congestion information or the like may also be displayed on the map. The display unit 15 may also be composed of a plasma display, an organic EL (electro-luminescence) display or the like.

The audio-output unit 16 is composed of a speaker, and outputs the sound guidance of the various kinds based on the data that is memorized in the map data storage 12.

The control unit 17 is composed of, as its core part, a well-known microcomputer having a CPU, a ROM, RAM, I/O and a bus for connecting these components. The control unit 17 executes a program stored in the ROM or the like for performing a map display process that displays a map on the display unit 15 based on a user input, an airport facility guidance process for guiding the user to a desired facility in the airport when the user specifies an airport as the destination, according to the user operation of the operation switch 14.

The communication unit 11 in the embodiment is an equivalent of a service information acquisition unit in claims, and the operation switch 14 is an equivalent of a service number determination unit and a purpose determination unit in claims, and the control unit 17 is an equivalent of a destination determination unit, a guidance provision unit and an arrival time estimation unit in claims.

The flowcharts of FIGS. 4 to 7 are about the airport terminal guidance process which is executed by the control unit 17. Practically, the processes shown in the present flowcharts are executed according to the computer program which is memorized in the control unit 17.

Figure 4:
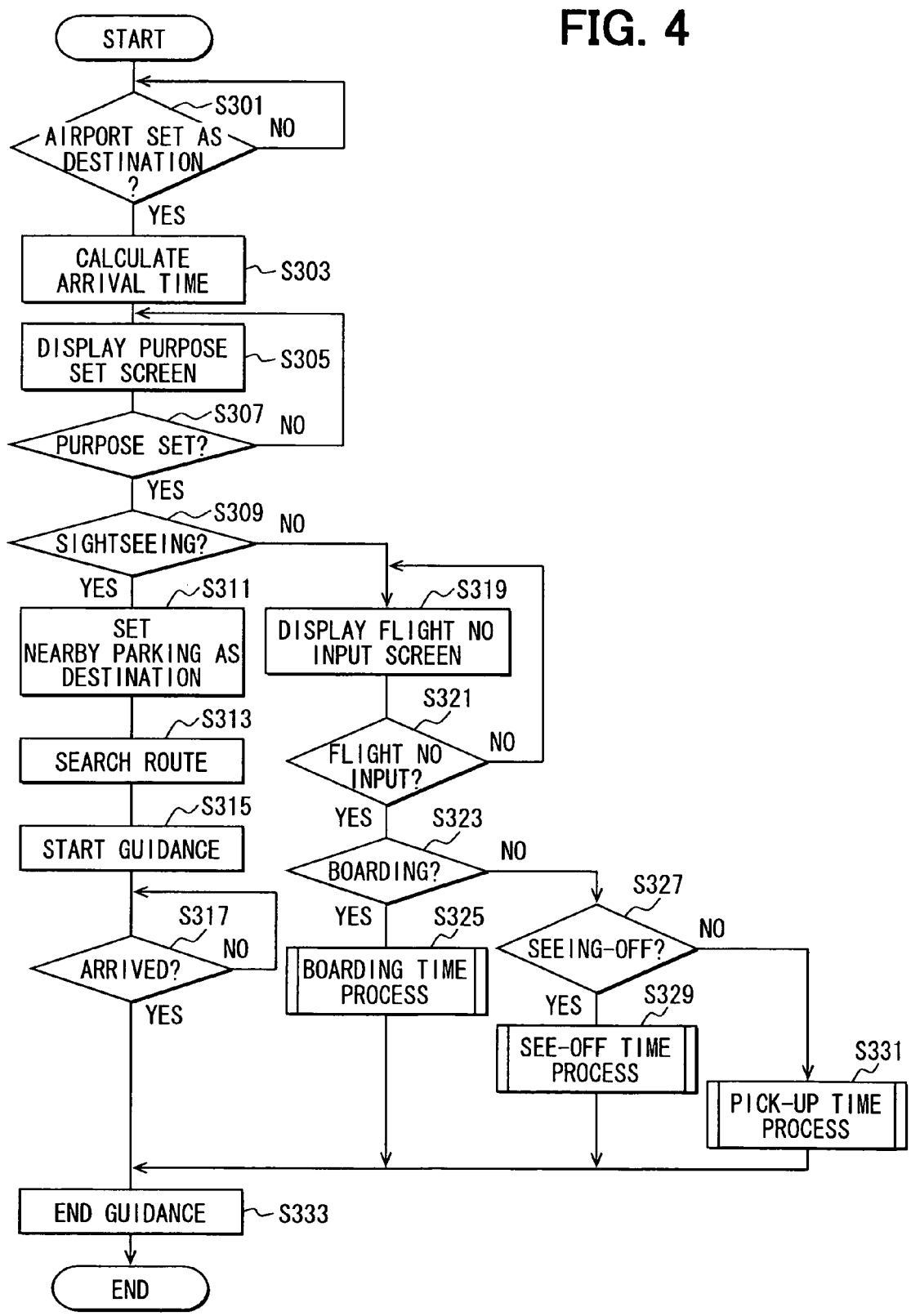
FIG. 4 is a flowchart which shows an airport terminal guidance process in the embodiment of the present invention.

First, the airport terminal guidance process determines whether or not the destination set by using the operation switch 14 by the user in step S301 of FIG. 4 is an airport. If it is YES in S301, it shows that the set destination is the place that includes multiple facilities in the site. When the destination is set to the airport (S301:YES), the process proceeds to step S303. The step S301 repeats itself until the destination is set to the airport. Then, in step S303, the process calculates an estimated arrival time to the airport.

The estimated arrival time is calculated based on a distance to the airport from the present location of the vehicle detected by the vehicle position detection unit 13 and congestion status on the way to the airport. In this case, the estimated arrival time to the airport is calculated as an arrival time to a "representative place/facility" in the airport, such as a parking facility in the airport or the like.

In step S305, the process displays a purpose set screen on the display unit 15 as shown in FIG. 3A. Next, the process determines in step S307 whether or not the user has set a purpose to go to the airport by using the operation switch 14 from the purpose set screen displayed in step S303. When a purpose is set (S307:YES), the process proceeds to step S309. When a purpose is not set, the process returns to step S305, and continues the display of the purpose set screen.

In step S309, the process determines whether or not the user's purpose to go to the airport is sightseeing of the airport facilities. When "SIGHTSEEING" is set by the user from the purpose set screen (S309:YES), the process proceeds to step S311. When a purpose other than "SIGHTSEEING" is set by the user (S309:NO), it is assumed that the purpose of going to the airport is either (a) user's boarding on a flight or (b) seeing-off or picking-up of someone. That is, the process proceeds to step S319.

In step S311, assuming that the user's purpose is sightseeing, a parking close to a shopping mall in the airport is set as the destination in the airport. Then, in step S313, the process searches for a route to the destination in the airport, which is set in step S311. In step S315, the process starts guidance based on the route which was searched for in step S313. In step S317, whether or not the vehicle arrived at the destination, and if it is YES in S317, the process proceeds to step S333. The process repeats step S317 until the vehicle arrives at the destination.

In step S319, the process displays a flight number input screen on the display unit 15 as shown in FIG. 3B. Next, the process determines whether or not a flight number is entered by the user in step S321. When a flight number is entered from the flight number input screen by the user (S321:YES), it is assumed either (a) the user is boarding or (b) the user is seeing-off/picking-up someone, thus the process proceeds to step S323. When a flight number is not input from the flight number input screen by the user, the process returns to step S319, and continues the display of the flight number input screen.

In step S323, the process determines whether or not the purpose for going to the airport is boarding of all of the occupants of the vehicle. That is, when "BOARDING" is set by the user from the purpose set screen (S323:YES), the process proceeds to step S325, and the guidance subroutine of boarding is executed. The details of the guidance subroutine of boarding are explained later. When "BOARDING" is not set by the user from the purpose set screen (S323:NO), the process determines that the user's purpose is seeing-off or picking-up, and the process proceeds to step S327.

In step S327, the process determines whether or not the user is seeing-off some of the occupants of the vehicle. That is, if "SEEING-OFF" is set by the user from the purpose set screen (S327:YES), the process proceeds to S329 and the guidance subroutine of seeing-off is executed. The details of the guidance subroutine of seeing-off are explained later. If "PICKING-UP" is set by the user from the purpose set screen (S327:NO), the process proceeds to S311 and the guidance subroutine of picking-up is executed. The details of the guidance subroutine of picking-up are explained later.

In step S333, the process ends the guidance, and also ends the airport terminal guidance process.

Figure 5:
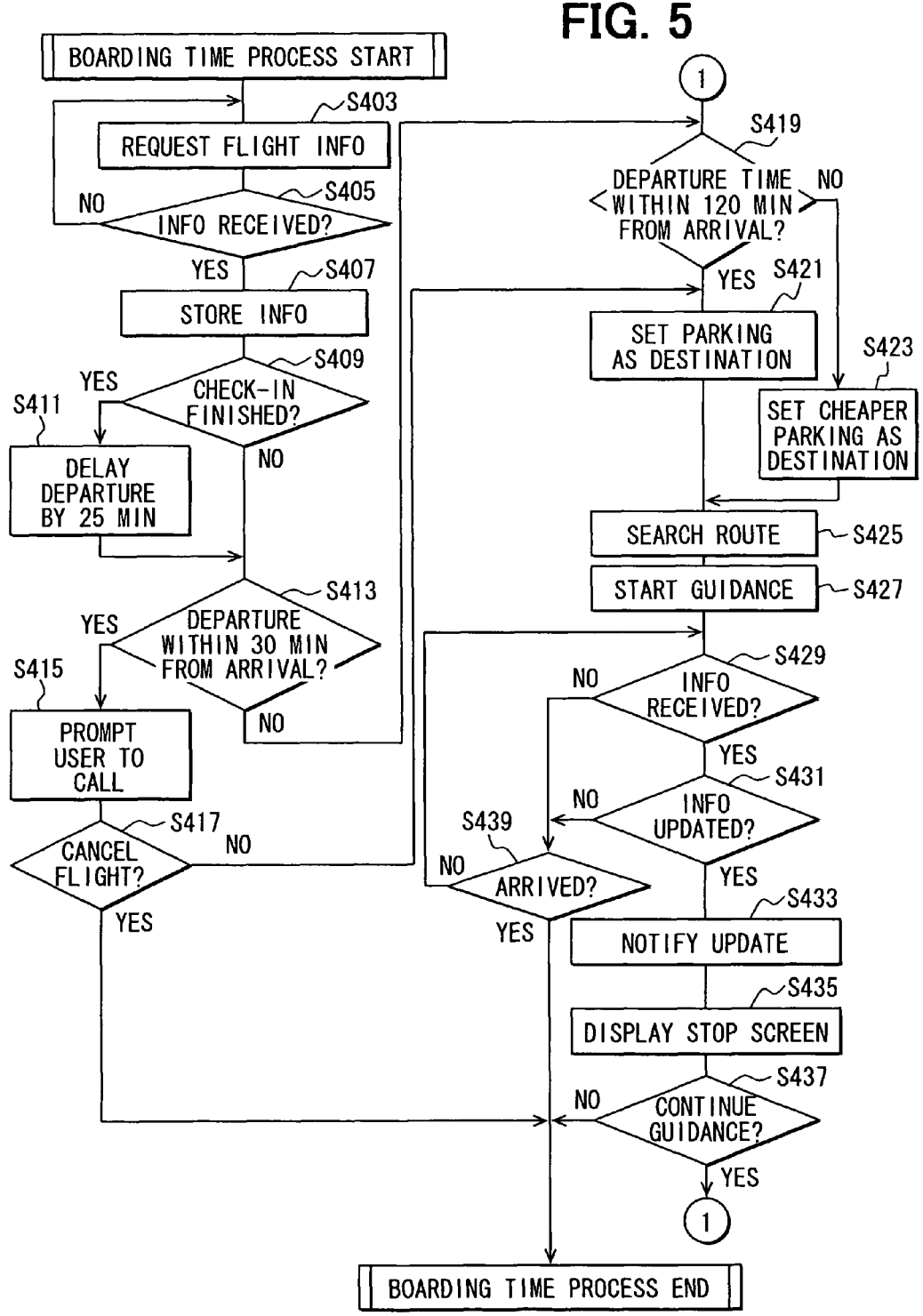
FIG. 5 is a flowchart which shows a guidance subroutine of boarding in the embodiment of the present invention.

Next, with reference to the flowchart of FIG. 5, the guidance subroutine of boarding in the step S325 of FIG. 4 is explained. When the user's purpose for going to the airport is boarding of all of the occupants of the vehicle, this guidance subroutine of boarding is started. First, in step S403, the process sends, to the information distribution center 100, a flight information request signal for requesting distribution of the flight information through the communication unit 11. In step S405, the process determines whether or not it received a flight information list 101 which is distributed from the information distribution center 100. When receiving the flight information list 101 (S405:YES), the process proceeds to step S407. When the flight information list 101 can not be received, the process returns to step S403, and sends a flight information request signal again.

In step S407, the process stores, from among information in the received flight information list 101, the flight information which corresponds to the flight number that is determined to be input by the user in step S321 of FIG. 4. In this case, if the user-desired flight information has a status that is different from schedule, the flight information is stored according to the contents of changed schedule. For example, if the user-input flight number is "TK50", the status shows that the delay of the departure is 30 minutes. Therefore, the departure time is stored as 12:49, which is changed from 12:19. The flight information may be notified for the user through the audio-output unit 16 or from the display unit 15. Also, when the status of the flight information is a flight cancellation, the process may proceed to S415 for prompting the user to place a call to the carrier company, in order to facilitate the ticket refund, re-scheduling and the like.

In step S409, the process determines whether or not the checking-in of the user-desired flight has already finished through Internet or the like, based on the input of the user. If the user input indicates that the checking-in has already finished (S409:YES), the process proceeds to S411, and the departure time of the flight information stored in S407 is increased by 25 minutes, because the checking-in process is not necessary any more. If the input indicates that the checking-in has not finished yet (S409:NO), the process proceeds to step S413.

In step S413, the process determines whether or not the departure time of the flight information is within 30 minutes from the estimated arrival time of the user to the airport (or, whether the estimated arrival time to the airport is within 5 minutes from the actual departure time of the flight, if the checking-in has already finished). If the estimated arrival time is within 30 minutes (S413:YES), the process proceeds to step S415 because it may lead to miss the departure time of the flight. If the estimated arrival time is not within 30 minutes, that is, if there is more-than 30 minute spare time (S413:NO), the process proceeds to step S419.

In step S415, the process prompts the use to place a call to the carrier company, due to the possibility to miss the flight. The process may notify the user of the telephone number of the carrier company of the desired flight at the same time, through the display unit 15 and/or the audio-output unit 16. In addition, the process displays a flight cancellation input screen which prompts the user to input a flight cancellation choice. In step S417, the process determines whether or not to cancel a flight based on the user input. If the input indicates the cancellation (S417:YES), the guidance subroutine is finished. If the input indicates not canceling the flight and continuation of guidance (S417:NO), the process proceeds to step S421.

In step S419, the process determines whether or not the estimated arrival time of the vehicle to the airport is within 120 minutes from the departure time of the flight (or, whether the estimated arrival time is within 95 minutes from the actual departure time of the flight, if the checking-in has already finished). If it is within 120 minutes (S419:YES), the process proceeds to step S421. If it is equal to or more than 120 minutes (S419:NO), the process proceeds to step S423.

In step S421, the process sets a parking close to the departure terminal of the flight as the destination in the airport, because it is within 120 minutes from the departure time of the flight. In step S423, due to sufficient spare time to the flight departure time, the process sets a parking that is cheaper and not too-far from the departure terminal as the destination in the airport. In this case, the parking may be a general purpose parking outside of the airport, and the destination category may be changed from "airport" to "parking." In step S425, the route to the destination in the airport set in step S421, or to the destination set in step S423 from the present location is searched for. In step S427, the process starts guidance according to the route which was searched for in step S425.

In case that the estimated arrival time of the user to arrive at the destination is changed by more than a predetermined time due to an accident, congestion or the like, or due to the resolution of accident/congestion after the start of the guidance, the process may preferably be performed again from step S413.

In step S429, the process determines whether or not it has received the flight information which is regularly distributed from the information distribution center 100. If the regularly distributed flight information list 101 distributed from the information centre 100 is received (S429:YES), the process proceeds to step S431. If the flight information list 101 is not received (S429:NO), the process proceeds to step S437.

In step S431, the process determines whether there is a change between the flight information on the flight information list 101 received in step S429 and the currently stored flight information. That is, whether the flight information is updated is examined in S431. The flight information currently stored is the flight information stored in step S407, or the flight information after change that is memorized in step S433. If the received information is changed and is different from the currently stored information (S431:YES), the process proceeds to step S433. When there is no change of flight information (S431:NO), the process proceeds to step S437.

In step S433, the process stores the after-change flight information if the change is detected in S429, and notifies the user of the changed contents of the flight information. The notification to the user is performed through the display unit 15 and/or the audio-output unit 16. In step S435, the process displays the guide stop input screen which prompts the user to input whether or not to stop guidance as shown in FIG. 3C. In step S437, the process determines whether or not to continue guidance based on the input by the user from the guide stop input screen that was displayed in step S435. When the user input indicates guidance continuation, and guidance is continued (S437:YES), the process returns to step S419. When the user input indicates guidance stop, and guidance is stopped (S437:NO), the guidance subroutine is finished.

In step S439, the process determines whether or not the vehicle has arrived at the destination. If arriving at the destination (S439:YES), the guidance subroutine is finished. If not arriving at the destination (S439:NO), the process returns to step S429.

Figure 6:
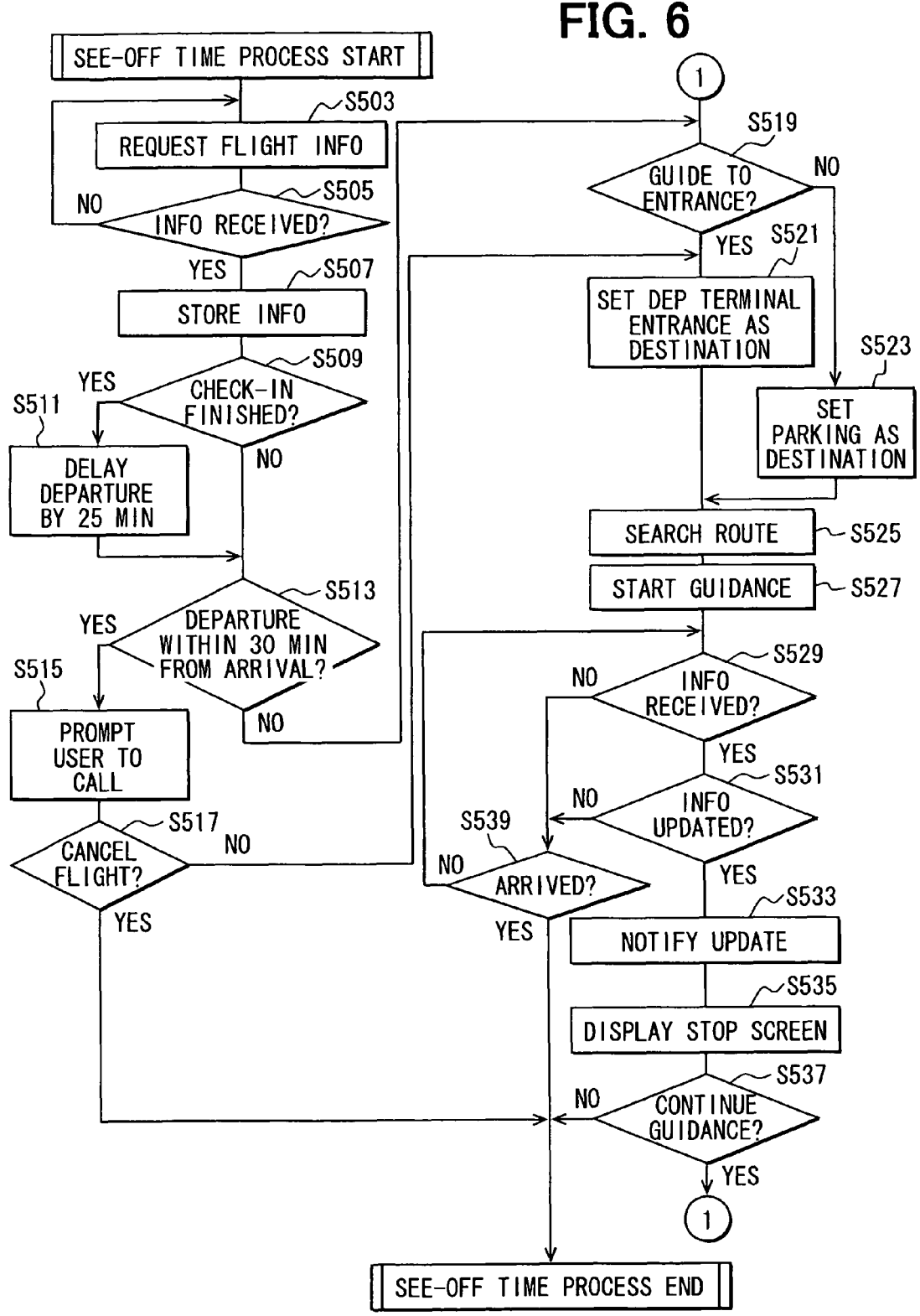
FIG. 6 is a flowchart which shows a guidance subroutine of seeing-off in the embodiment of the present invention.

Next, with reference to the flowchart of FIG. 6, the guidance subroutine of seeing-off in the step S329 of FIG. 4 is explained. When the purpose for going to the airport is seeing-off of some of the occupants in the vehicle at the airport, the guidance subroutine of seeing-off is started. First, in step S503, it sends to the information distribution center 100 the flight information request signal which requests the distribution of the flight information through the communication unit 11. In step S505, the process determines whether or not it received the flight information list 101 which is distributed from the information distribution center 100. If receiving the flight information list 101 (S505:YES), the process proceeds to step S507. If the flight information list 101 can not be received (S505:NO), the process returns to step S503, and sends the flight information request signal again.

In step S507, the process stores, from among the flight information in the received flight information list 101, the flight information which corresponds to the flight number that is input by the user in step S321 in FIG. 4. In this case, if the user-desired flight information has a status that is different from schedule, the flight information is stored according to the contents of changed schedule. The flight information may be notified for the user through the audio-output unit 16 or from the display unit 15. Also, when the status of the flight information is a flight cancellation, the process may proceed to S515 for prompting the user to place a call to the carrier company.

In step S509, the process determines whether or not the checking-in of the user-desired flight has already finished through Internet or the like, based on the input of the user. If the user input indicates that the checking-in has already finished (S509:YES), the process proceeds to S511, and the departure time of the flight information stored in S507 is increased by 25 minutes, because the checking-in process is not necessary any more. If the input indicates that the checking-in has not finished yet (S509:NO), the process proceeds to step S513.

In step S513, the process determines whether or not the departure time of the flight information is within 30 minutes from the estimated arrival time of the user to arrive at the airport (or, whether the estimated arrival time to the airport is within 5 minutes from the actual departure time of the flight, if the checking-in has already finished). If the estimated arrival time is within 30 minutes (S513:YES), the process proceeds to step S515 because it may lead to miss the departure time of the flight. If the estimated arrival time is not within 30 minutes, that is, if there is more-than 30 minute spare time (S513:NO), the process proceeds to step S519.

In step S515, the process prompts the use to place a call to the carrier company, due to the possibility to miss the flight. The process may notify the user of the telephone number of the carrier company of the desired flight at the same time, through the display unit 15 and/or the audio-output unit 16. In addition, the process displays a flight cancellation input screen which prompts the user to input a flight cancellation choice. In step S517, the process determines whether or not to cancel a flight based on the user input. If the input indicates the cancellation (S517:YES), the guidance subroutine is finished. If the input indicates not canceling the flight and continuation of guidance (S517:NO), the process proceeds to step S521.

In step S519, the process determines whether or not the user desires guidance to the entrance of the departure terminal, based on the user input. If the user desires guidance to the entrance of the departure terminal (S519:YES), the process proceeds to step S521, and sets the entrance of the departure terminal as the destination in the airport. If the user does not desire guidance to the entrance (S519:NO), the process proceeds to step S523, and sets a parking close to the departure terminal as the destination in the airport.

In step S525, the route to the destination in the airport set in step S521 or S523 from the present location is searched for. In step S527, the process starts guidance according to the route which was searched for in step S525. In case that the estimated arrival time of the user to arrive at the estimation in the airport is changed by more than a predetermined time due to an accident, congestion or the like, or due to the resolution of accident/congestion after the start of the guidance, the process may preferably be performed again from step S513.

In step S529, the process determines whether or not it has received the flight information which is regularly distributed from the information distribution center 100. If the regularly distributed flight information list 101 distributed from the information centre 100 is received (S529:YES), the process proceeds to step S531. If the flight information list 101 is not received (S529:NO), the process proceeds to step S539.

In step S531, the process determines whether there is a change between the flight information on the flight information list 101 received in step S529 and the currently stored flight information. That is, whether the flight information is updated is examined in S531. If the received information is changed and is different from the currently stored information (S531:YES), the process proceeds to step S533. When there is no change of flight information (S531:NO), the process proceeds to step S539.

In step S533, the process stores the after-change flight information, and notifies the user of the changed contents of the flight information through the display unit 15 and/or the audio-output unit 16. In step S535, the process displays the guide stop input screen which prompts the user to input whether or not to stop guidance as shown in FIG. 3C. In step S537, the process determines whether or not to continue guidance based on the input by the user from the guide stop input screen that was displayed in step S535. When the user input indicates guidance continuation, and guidance is continued (S537:YES), the process returns to step S519. When the user input indicates guidance stop, and guidance is stopped (S537:NO), the guidance subroutine is finished.

In step S539, the process determines whether or not the vehicle has arrived at the destination. If arriving at the destination (S539:YES), the guidance subroutine is finished. If not arriving at the destination (S539:NO), the process returns to step S529.

Figure 7:
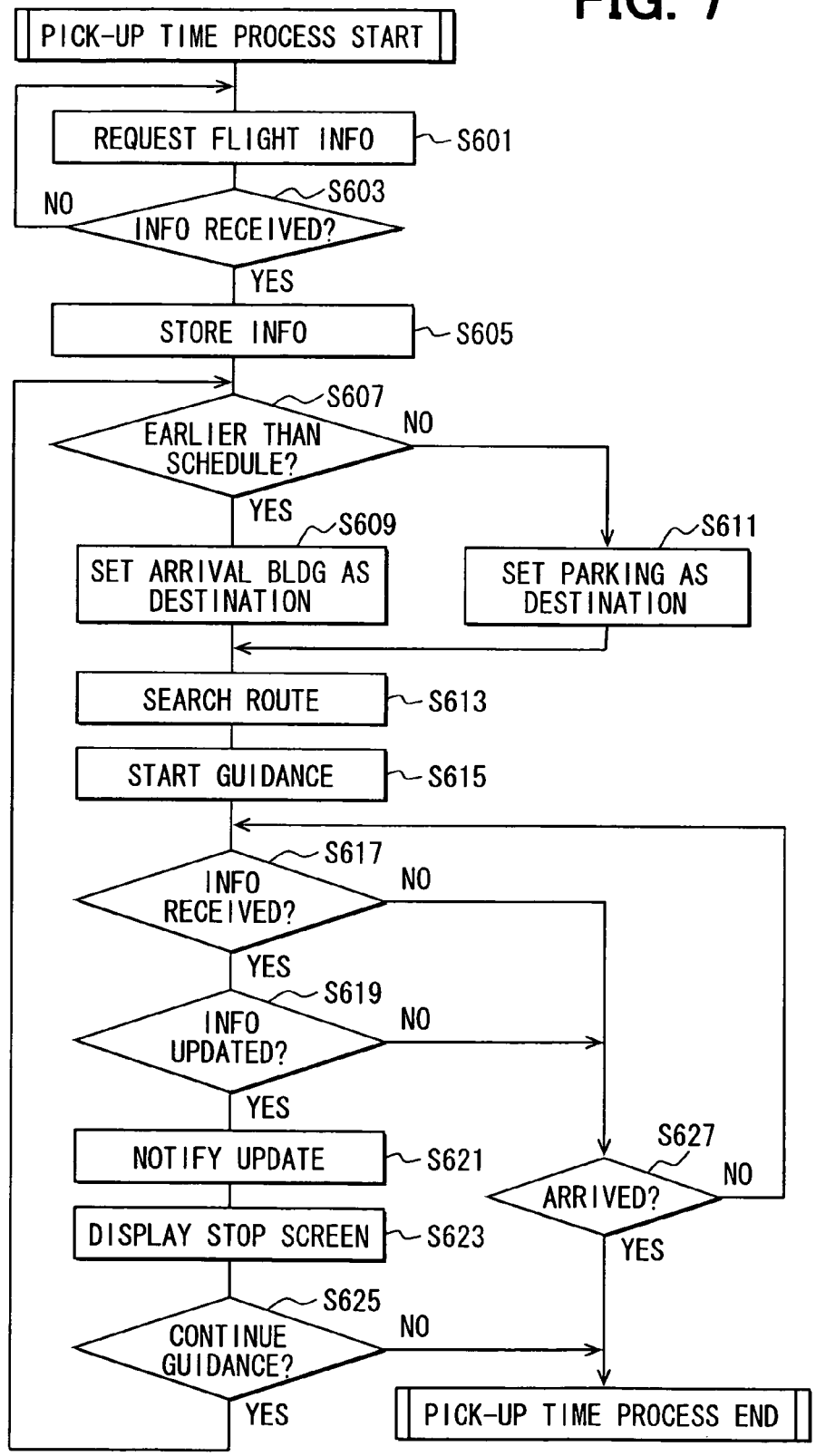
FIG. 7 is a flowchart which shows a guidance subroutine of picking-up in the embodiment of the present invention.

Next, with reference to the flowchart of FIG. 7, the guidance subroutine of picking-up in the step S331 of FIG. 4 is explained. When the purpose for going to the airport is picking-up of someone at the airport, the guidance subroutine of picking-up is started. First, in step S601, it sends to the information distribution center 100 the flight information request signal which requests the distribution of the flight information through the communication unit 11. In step S603, the process determines whether or not it received the flight information list 101 which is distributed from the information distribution center 100. If receiving the flight information list 101 (S603:YES), the process proceeds to step S605. If the flight information list 101 can not be received (S603:NO), the process returns to step S601, and sends the flight information request signal again.

In step S605, the process stores, from among the flight information in the received flight information list 101, the flight information which corresponds to the flight number that is input by the user in step S321 in FIG. 4. In this case, if the user-desired flight information has a status that is different from schedule, the flight information is stored according to the contents of changed schedule. The flight information may be notified for the user through the audio-output unit 16 or from the display unit 15. For example, if the user-input flight number is "JL5230," the status shows that the delay of the arrival is 45 minutes. Therefore, the arrival time is stored as 13:05, which is changed from 12:20. Also, when the status of the flight information is a flight cancellation, the process may prompt the user to place a call to the carrier company.

In step S607, the process determines whether or not the arrival time of the flight is earlier than the estimated arrival time of the vehicle to the airport. If When the flight arrival time is earlier than the estimated arrival time of the vehicle to the airport (S607:YES), the process proceeds to step S609. If the flight arrival time is later than the estimated arrival time of the vehicle to the airport (S607:NO), the process proceeds to step S611.

In step S609, the process sets the entrance of the arrival terminal as the destination in the airport. In step S611, the process sets a parking close to the arrival terminal as the destination in the airport. In step S613, the route to the destination in the airport set in step S609 or S611 from the present location is searched for. In step S615, the process starts guidance according to the route which was searched for in step S613. In case that the estimated arrival time of the user to arrive at the destination is changed by more than a predetermined time due to an accident, congestion or the like, or due to the resolution of accident/congestion after the start of the guidance, the process may preferably be performed again from step S607.

In step S617, the process determines whether or not it received the flight information which is regularly distributed from the information distribution center 100. If the regularly distributed flight information list 101 distributed from the information centre 100 is received (S617:YES), the process proceeds to step S619. If the flight information list 101 is not received (S617:NO), the process proceeds to step S627.

In step S619, the process determines whether there is a change between the flight information on the flight information list 101 determined to be received in step S617 and the currently stored flight information. That is, whether the flight information is updated is examined in S619. If the received information is changed and is different from the currently stored information (S619:YES), the process proceeds to step S621. When there is no change (S619:NO), the process proceeds to step S627.

In step S621, the process notifies the user of the changed contents of the flight information through the display unit 15 and/or the audio-output unit 16, and stores the changed contents of the flight information (i.e., updates the stored flight information). In step S623, the process displays the guide stop input screen which prompts the user to input a choice regarding whether or not to stop guidance as shown in FIG. 3C. In step S625, he process determines whether or not to continue guidance based on the input by the user from the guide stop input screen that was displayed in step S623. When the user input indicates guidance continuation, and guidance is continued (S625:YES), the process returns to step S607. When the user input indicates guidance stop, and guidance is stopped (S625:NO), the guidance subroutine is finished.

In step S627, the process determines whether or not the vehicle has arrived at the destination. If arriving at the destination (S627:YES), the guidance subroutine is finished. If not arriving at the destination (S627:NO), the process returns to step S617.

As explained above, when the flight information of the user-desired flight is acquired from the flight information list 101 which is distributed from the information distribution center 100, the vehicle navigation apparatus 10 guides the user to a suitable facility in the airport based on the acquired flight information. Even when there are many terminals and parking buildings in the airport, the user is guided to a suitable terminal or to a suitable parking building close to the suitable terminal, based on the flight information. As a result, the user can save a long walk and/or a long move in the airport from a mis-guided terminal to the suitable terminal, for example, thereby saving the walk/move time.

Further, based on the received flight information, the user is guided to the suitable terminal/parking even when there is a change in the flight schedule, due to a process that re-sets (i.e., updates) the destination. For example, when the departure/arrival terminal of the intended vehicle (i.e., flight, train, ship or any other vehicle) is changed, the user is guided to the changed terminal of the flight, or to the parking close to the changed terminal. Further, when the departure/arrival time of the intended flight is delayed, the destination in the airport is changed according to the spare time to the delayed departure/arrival time of the flight. Further, when the flight is cancelled due to the bad weather or the like, or when the flight is delayed by many hours, the user can received that information regarding the delay or cancellation of the flight prior to arriving at the airport. In other words, the vehicle navigation apparatus 10 enables the user to cancel the guidance to the airport, or enables the user to change the destination, thereby improving the user's convenience.

Further, because the user can acquire the flight information based on an input of the flight number, the user's convenience is improved. Furthermore, because the purpose for going to the airport is considered, the guidance provided by the vehicle navigation apparatus 10 accords with the user's purpose to go to the airport and further improves the user's convenience.

Although the present disclosure has been fully described in connection with preferred embodiment thereof with reference to the accompanying drawings, it is to be noted that various changes and modifications will become apparent to those skilled in the art.

MODIFICATION EXAMPLE 1

The modification of the above embodiment is explained. In the present modification example, the process for sending the flight information request signal is configured to send the request every 5 minutes, for example, in order to receive the flight information list 101 at short intervals. In this manner, the change of the flight information of the user-desired flight can be quickly reflected to the guidance.

MODIFICATION EXAMPLE 2

Another modification example of the above embodiment is explained. In the present modification example, the process determines if the user-desired flight is an international flight or a domestic flight. That is, the guidance is changed according to the type of the flight, such as international, domestic, or the like. For example, if the user-desired flight is determined as an international flight based on the flight information, the guidance is configured to include a longer spare time before the departure time of the international flight in comparison to the guidance for the domestic flight. In other words, because the check-in and other procedure for the international flight generally take a longer time, the guidance is set to notify the user of an earlier arrival time to the airport. In this manner, the vehicle navigation apparatus 10 can appropriately guide the user to the suitable terminal or parking at a suitable time for boarding or the like.

MODIFICATION EXAMPLE 3

Figure 8:
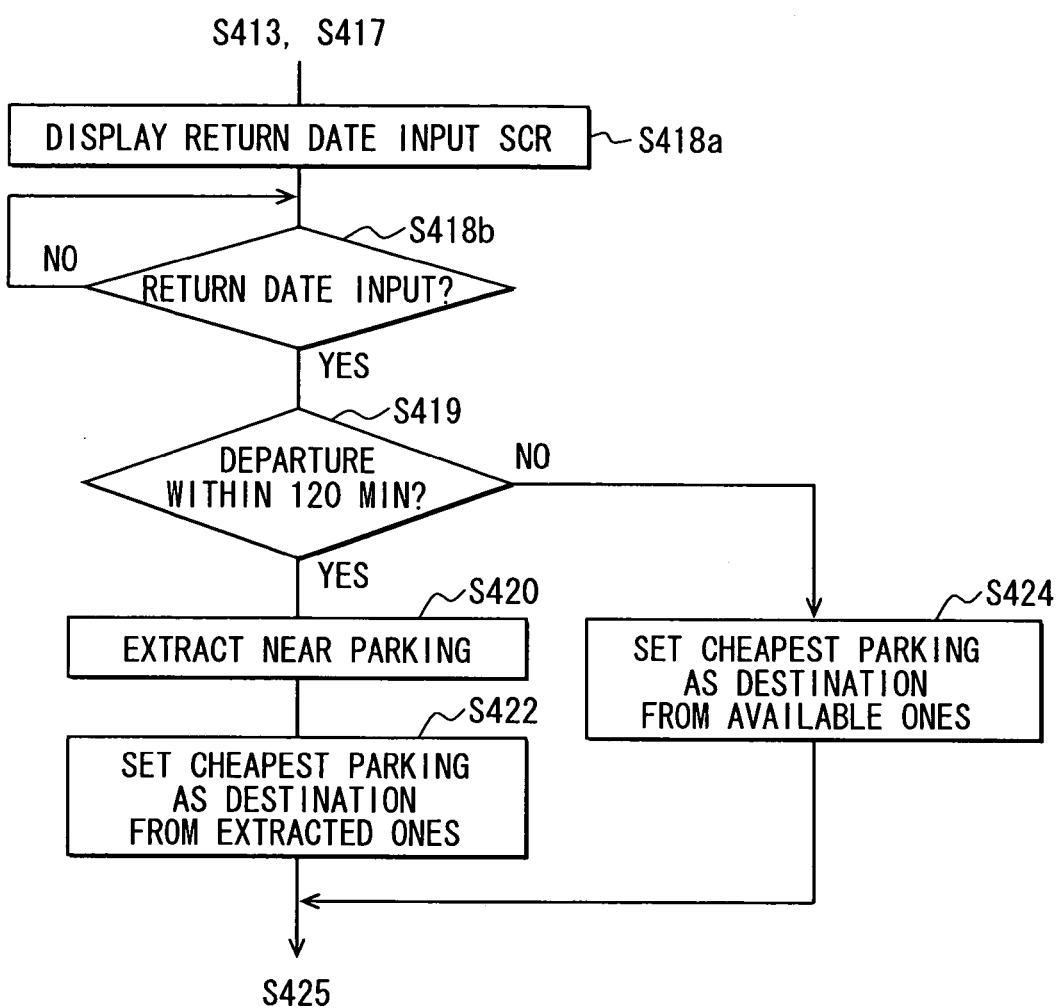
FIG. 8 is a modification of the flowchart which shows a guidance subroutine of boarding in the embodiment of the present invention.

Yet another modification example of the above embodiment is explained. The modification is about the process of the guidance subroutine of boarding. The flowchart of the guidance subroutine of boarding for the modification example is shown in FIG. 8. FIG. 8 shows a changed portion of the process relative to the guidance subroutine of boarding in FIG. 5. Steps S403 to S417, and S425 to S439 remain unchanged from FIG. 5. Therefore, detailed explanation for those steps is omitted.

As show in FIG. 8, an input screen is displayed in step S418a for an input of a return date (or a return flight number) by the user in this modification example. Then, in step S418b, whether the user has input the return date (or the return flight number) in the input screen is determined. If the user has input the return date or the return flight number (S418b:YES), the process proceeds to step S419. If the user has not input the return date or the return flight number (S418b:NO), the process returns to step S418a, and continues to display the input screen.

In step S419, time difference between the estimated arrival time and the departure time of the flight is examined. That is, whether the estimated arrival time to the airport is within 120 minutes from the flight departure time (or, whether the estimated arrival time to the airport is within 95 minutes from the departure time of the flight, if the checking-in has already finished) is examined. If the time difference is within 120 minutes (S419:YES), the process proceeds to step S420. If the time difference is not within 120 minutes (S419:NO), the process proceeds to step S424.

In step S420, a near parking, that is, a parking facility within a predetermined distance from the departure terminal, is extracted, because the time difference is within 120 minutes from the flight departure time. Then, in step S422, the return date or the return flight number in step S418a, S418b is used to calculate the number of days of parking of the user-own vehicle in the parking facility. Further, in consideration of the days of parking, a parking facility having the most competitive parking fee is selected and set as the destination, from among the parking facilities extracted in S420. In this case, if only one parking facility has been extracted in S420, the extracted parking facility is set as the destination. If no parking facility has been found within a predetermined distance in S420, a nearest parking facility around the departure terminal is selected from available parking facilities and set as the destination.

For example, let us assume that the near parking facility is defined as a parking facility within 500 meters from the departure terminal. In this case, a parking fee table in FIG. 9 shows that a parking A and a parking E are extracted in step S420. Then, if the user is planning a day trip, the parking A is set as the destination in S422, because the parking A is less expensive than the parking E according to the parking fee table. If the user is planning two or more days for a trip, the parking fee of the parking E is less expensive than the parking fee of the parking A for that period of time. Therefore, if the calculated number of days is equal to or more than two, the parking E is set as the destination in S422.

In step S424, because the time to flight departure is more than 120 minutes, allowing the user with sufficient spare time, a parking facility having the most in-expensive parking fee is selected and set as the destination from among the parking facilities around the airport. More practically, a parking facility available by the most in-expensive parking fee according to a registered parking fee table of FIG. 9 is selected from among the parking facilities registered in the table of FIG. 9, based on the calculated days of parking, for facilitating the cost-effective budgeting for parking fee by the user.

In the example of the parking fee table in FIG. 9, parking fees of a parking B are most competitive (i.e., in-expansive) for all of the days (i.e., 1 day fee to 8 day fee) of parking. Therefore, when the time to the flight departure is more than 120 minutes, the parking B is set as the destination.

In the calculation of the parking fee, a ride fee paid for a ride from the parking facility to the airport is counted as a part of the parking fee. Such changes, modifications, and summarized schemes are to be understood as being within the scope of the present disclosure as defined by appended claims.

The above described navigation apparatus thus has a series of advantageous effects as follows. That is:

(1) The change of the flight information such as change of the arrival/departure terminal is "covered" by the navigation apparatus.
(2) The user of the navigation apparatus is guided to the changed terminal in the airport without delay.
(3) The cancellation of the flight or a delay of the flight is notified prior to departure from home to the airport.
(4) The guidance to the airport may be immediately stopped or may be continued depending on the user input.
(5) The flight number of the intended flight can be directly input, instead of selecting the flight number from a flight number list.
(6) The change of the flight information is acquired at the time of inputting the flight number by the user. That is, the change of the flight information is immediately reflected to the guidance provided by the navigation apparatus.
(7) The change of the flight information is checked every 5 minutes or the like, thereby allowing the user to immediately check and confirm the change of the flight information of the intended flight.
(8) The purpose of going to the airport, such as seeing-off, picking-up, and/or boarding is considered and reflected to the guidance, thereby navigating the user to a suitable place, such as an entrance of the departure terminal of the intended flight.
(9) The amount of the spare time to the departure/arrival time of the intended flight is considered and reflected to the guidance, thereby navigating the user to a suitable place, such as a less-expensive but not-too-far parking facility or the like.
(10) Both of the amount of the spare time and the change of the flight information of the intended flight are considered and reflected to the guidance, thereby improving the user's convenience in the airport even when the flight schedule of the intended flight is changed during a travel to the airport, for example.
(11) According to the parking fee table, the cheapest parking facility is selected as the guidance destination. Therefore, the cost effectiveness of the parking fee is added to the guidance criteria.
(12) When the time to flight departure is tight, the guidance destination is set to the parking facility close to the departure terminal, upon acquiring the information of the schedule change of the flight. Even in that case, a parking facility having the competitive parking fee is selected from among available facilities and set as the guidance destination, based on the registered parking fee table in the navigation apparatus.

What is claimed is:

1. A navigation apparatus for providing a user with route guidance to a destination, the apparatus comprising:
a processor, the processor is configured to
    determine, from a service number determination unit, a service number of a vehicle service based on a user input;
    determine, a destination determination unit, as the destination of the guidance, a terminal-related place in an entire vehicle boarding place of the vehicle service based on the service number determined by the service number determination unit;
    acquire, by a service information acquisition unit, from an information center, service information of the vehicle service having the service number determined by the service number determination unit, the service information including a schedule diversion condition of the determined service number of the vehicle service;
    provide, in a guidance provision unit, the user with diversion advisory guidance regarding diversion of the terminal-related place from an original terminal-related place that is originally determined by the destination determination unit based on the acquired service information of the vehicle service; and
    change, in the guidance provision unit, the terminal-related place determined by the destination determination unit according to the acquired service information of the vehicle service and provide the user with updated guidance, when the schedule diversion condition of the determined service number is acquired by the service information acquisition unit as the service information of the vehicle service.

2. The navigation apparatus of claim 1, wherein
the guidance provision unit prompts the user to input a choice of whether to cancel the guidance or continue the guidance when the schedule diversion condition of the determined service number is acquired by the service information acquisition unit as the service information of the vehicle service.

3. The navigation apparatus of claim 2, wherein
the guidance provision unit is configured to cancel the guidance to the terminal-related place based on the user input when the schedule diversion condition of the determined service number is acquired by the service information acquisition unit as the service information of the vehicle service.

4. The navigation apparatus of claim 1, wherein
the service number determination unit determines a user-desired vehicle service based on a service number that is directly input by the user.

5. The navigation apparatus of claim 1, wherein
the service information acquisition unit acquires, through communication performed with the information center, the schedule diversion condition of the determined service number that is determined by the service number determination unit, when the service number of the vehicle service determined by the service number determination unit has schedule change.

6. The navigation apparatus of claim 1, wherein
the service information acquisition unit acquires the schedule diversion condition of the determined service number based on regular reception of a schedule of the determined service number at predetermined intervals through communication performed with the information center.

7. The navigation apparatus of claim 1, wherein the processor is further configured to
determine, in a purpose determination unit, a purpose of the user to go to the vehicle boarding place of the vehicle service, wherein
the destination determination unit determines the terminal-related place provided for the user as the guidance destination unit based on the purpose of the user determined by the purpose determination unit.

8. The navigation apparatus of claim 1, wherein the processor is further configured to
estimate, in an arrival time estimation unit, a user arrival time to the vehicle boarding place, wherein
the destination determination unit determines the terminal-related place provided for the user as the guidance destination based on the user arrival time estimated by the arrival time estimation unit and the service number departure/arrival time determined by the service number determination unit.

9. The navigation apparatus of claim 8, wherein
the guidance provision unit diverts the terminal-related place determined by the destination determination unit based on time difference between the user arrival time and the service number departure/arrival time, if at least one of the user arrival time estimated by the arrival time estimation unit and the service number departure/arrival time included in the service information of the vehicle service acquired by the service information acquisition unit is changed.

10. The navigation apparatus of claim 1,
wherein the processor is further configured to calculate, in a park day calculation unit, a number of days of parking of a user-owned vehicle based on the user input; and
further comprising a fee table storage unit for storing a fee table of park fees corresponding to the number of days of parking regarding a plurality of parking facilities around the vehicle boarding place, wherein
the destination determination unit determines as the destination of the guidance at least one of the plurality of parking facilities by selecting a parking facility that charges the user a competitive parking fee relative to the other parking facilities according to the number of days of parking calculated by the park day calculation unit and the fee tables of the respective parking facilities stored in the fee table storage unit.

11. The navigation apparatus of claim 10, wherein the processor is further configured to
estimate, an arrival time estimation unit, a user arrival time to the vehicle boarding place,
wherein
the destination determination unit determines as the destination of the guidance at least one of the plurality of parking facilities by (a) extracting from among the plurality of parking facilities at least one parking facility that is within a predetermined distance from the vehicle boarding place, and (b) selecting from among the extracted parking facilities a parking facility having a competitive parking fee, when time difference between (i) the user arrival time to the vehicle boarding place estimated by the arrival time estimation unit and (ii) the service number departure/arrival time found in the service information acquired by the service information acquisition unit is within a predetermined time period.

12. The navigation apparatus of claim 11, wherein,
when at least one of the user arrival time from the arrival time estimation unit and the service number departure/arrival time found in the service information acquired by the service information acquisition unit is changed, the guidance provision unit changes the parking facility determined by the destination determination unit based on time difference between the user arrival time and the service number departure/arrival time.

13. A method of providing a user with route guidance to a destination, the method comprising:
determining, by a processor of a navigation apparatus, a service number of a vehicle service based on a user input;
determining, by the processor of the navigation apparatus, as the destination of the guidance, a terminal-related place in an entire vehicle boarding place of the vehicle service based on the above-determined service number;
acquiring, by the processor of the navigation apparatus, from an information center, service information of the vehicle service having the above-determined service number, the service information including a schedule diversion condition of the determined service number of the vehicle service;
providing, by the processor of the navigation of the apparatus the user with diversion advisory guidance regarding diversion to another terminal-related place from the terminal-related place based on the acquired service information of the vehicle service; and
changing, by the processor of the navigation apparatus, the terminal-related place determined to be the destination of the guidance and providing the user with updated guidance, when the schedule diversion condition of the determined service number is acquired as the service information of the vehicle service.

14. The method of claim wherein claim 13, further comprising
prompting, by the processor of the navigation apparatus, the user to input a choice of whether to cancel the guidance or continue the guidance when the schedule diversion condition of the determined service number is acquired as the service information of the vehicle service.

15. The method of claim 14, further comprising
canceling, the processor of the navigation apparatus, the guidance to the terminal-related place based on the user input when the schedule diversion condition of the determined service number is acquired, as the service information of the vehicle service.

16. The method of claim 13, further comprising
determining, by the processor of the navigation apparatus, a user-desired vehicle service based on a service number that is directly input by the user.

17. The method of claim 13, wherein
the schedule diversion condition of the determined service number is acquired through communication performed with the information center when the service number of the vehicle service being determined has schedule change.

18. The method of claim 13, wherein
acquisition of the schedule diversion condition of the determined service number is performed based on regular reception of a schedule of the determined service number at predetermined intervals through communication performed with the information center.

19. The method of claim 13 further comprising:
determining, by the processor of the navigation apparatus, a purpose of the user to go to the vehicle boarding place of the vehicle service, wherein
guidance to the terminal-related place is diverted based on the determined purpose of the user to go to the vehicle boarding place.

20. The method of claim 13 further comprising:
estimating by the processor of the navigation apparatus, a user arrival time to the vehicle boarding place, wherein
guidance to the terminal-related place is diverted based on the user arrival time estimated and a service number departure/arrival time.

21. The method of claim 20, wherein
guidance to the terminal-related place is diverted based on time difference between the user arrival time to the vehicle boarding place and the ,service number departure/arrival time if at least one of the user arrival time and the service number departure/arrival time included in the acquired service information of the vehicle service is changed.

22. The method of claim 13 further comprising:
calculating, by the processor of the navigation apparatus a number of days of parking of a user-owned vehicle based on the user input; and
storing, by the processor of the navigation apparatus, a fee table of park fees corresponding to the number of days of parking regarding a plurality of parking facilities around the vehicle boarding place, wherein
guidance to at least one of the plurality of parking facilities is provided by selecting a parking facility that charges the user a competitive parking fee relative to the other parking facilities according to the calculated number of days of parking and the stored fee tables of the respective parking facilities.

23. The method of claim 22 further comprising:
estimating, by the processor of the navigation apparatus, a user arrival time to the vehicle boarding place, wherein
guidance to at least one of the plurality of parking facilities is provided by (a) extracting, from among the plurality of parking facilities, at least one parking facility that is within a predetermined distance from the vehicle boarding place, and (b) selecting from among the extracted parking facilities a parking facility having a competitive parking fee, when time difference between (i) the user arrival time to the vehicle boarding place and (ii) a service number departure/arrival time found in the acquired service information is within a predetermined time period.

24. The navigation apparatus of claim 23, wherein,
when at least one of the user arrival time and the service number departure/arrival time found in the acquired service information is changed, the at least one parking facility is changed based on time difference between the user arrival time and the service number departure/arrival time.

25. A navigation apparatus for providing a user with route guidance to a destination, the apparatus comprising:
a processor, the processor is configured to
determine, from a service number determination unit, a service number of a vehicle service based on a user input;
determine, in a destination determination unit, as the destination of the guidance, a terminal-related place in an entire vehicle boarding place of the vehicle service based on the service number determined by the service number determination unit;
acquire, by a service information acquisition unit, from an information center, service information of the vehicle service having the service number determined by the service number determination unit, the service information including a schedule diversion condition of the determined service number of the vehicle service;
provide, by a guidance provision unit, the user with diversion advisory guidance regarding diversion of the terminal-related place from an original terminal-related place that is originally determined by the destination determination unit based on the acquired service information of the vehicle service;
determine, in a purpose determination unit, a purpose of the user to go to the vehicle boarding place of the vehicle service;
estimate, in an arrival time estimation unit, a user arrival time to the vehicle boarding place;
calculate, in a park day calculation unit, a number of days of parking of a user-owned vehicle based on the user input; and
change, in the guidance provision unit, the terminal-related place determined by the destination determination unit according to the acquired service information of the vehicle service and provide the user with updated guidance, when the schedule diversion condition of the determined service number is acquired by the service information acquisition unit as the service information of the vehicle service; and
a fee table storage configured to a fee table of park fees corresponding to the number of days of parking regarding a plurality of parking facilities around the vehicle boarding place;
wherein
the guidance provision unit prompts the user to input a choice of whether to cancel the guidance or continue the guidance when the schedule diversion condition of the determined service number is acquired by the service information acquisition unit as the service information of the vehicle service,
the guidance provision unit is configured to cancel the guidance to the terminal-related place based on the user input when the schedule diversion condition of the determined service number is acquired by the service information acquisition unit as the service information of the vehicle service,
the service number determination unit determines a user-desired vehicle service based on a service number that is directly input by the user,
the service information acquisition unit acquires, through communication performed with the information center, the schedule diversion condition of the determined service number that is determined by the service number determination unit, when the service number of the vehicle service determined by the service number determination unit has schedule change,
the service information acquisition unit acquires the schedule diversion condition of the determined service number based on regular reception of a schedule of the determined service number at predetermined intervals through communication performed with the information center,
the destination determination unit determines the terminal-related place provided for the user as the guidance destination unit based on the purpose of the user determined by the purpose determination unit, the destination determination unit determines the terminal-related place provided for the user as the guidance destination based on the user arrival time estimated by the arrival time estimation unit and the service number departure/arrival time determined by the service number determination unit, the guidance provision unit diverts the terminal-related place determined by the destination determination unit based on time difference between the user arrival time and the service umber departure/arrival time, if at least one of the user arrival time estimated by the arrival time estimation unit and the service number departure/arrival time included in the service information of the vehicle service acquired by the service information acquisition unit is changed, the destination determination unit determines as the destination of the guidance at least one of the plurality of parking facilities by selecting a parking facility that charges the user a competitive parking fee relative to the other parking facilities according to the number of days of parking calculated by the park day calculation unit and the fee tables of the respective parking facilities stored in the fee table storage unit, the destination determination unit determines as the destination of the guidance at least one of the plurality of parking facilities by (a) extracting from among the plurality of parking facilities at least one parking facility that is within a predetermined distance from the vehicle boarding place, and (b) selecting from among the extracted parking facilities a parking facility having a competitive parking fee, when time difference between (i) the user arrival time to the vehicle boarding place estimated by the arrival time estimation unit and (ii) the service number departure/arrival time found in the service information acquired by the service information acquisition unit is within a predetermined time period, when at least one of the user arrival time from the arrival time estimation unit and the service number departure/arrival time found in the service information acquired by the service information acquisition unit is changed, the guidance provision unit changes the parking facility determined by the destination determination unit based on time difference between the user arrival time and the service number departure/arrival time.

* * * * *